Dec. 10, 1968    J. D. WISE    3,415,335
DRIVERLESS LAWN MOWER
Filed May 22, 1967    4 Sheets-Sheet 1

INVENTOR.
JOHN D. WISE
BY James J. Cannon
ATTORNEY

Dec. 10, 1968

J. D. WISE 3,415,335

DRIVERLESS LAWN MOWER

Filed May 22, 1967

INVENTOR.
JOHN D. WISE
BY James J. Cannon.
ATTORNEY.

Dec. 10, 1968  J. D. WISE  3,415,335
DRIVERLESS LAWN MOWER
Filed May 22, 1967  4 Sheets-Sheet 3
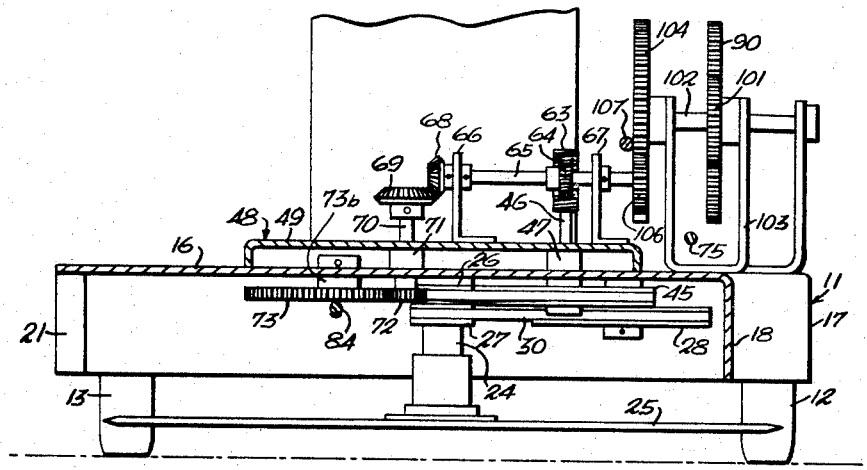
Fig. 4
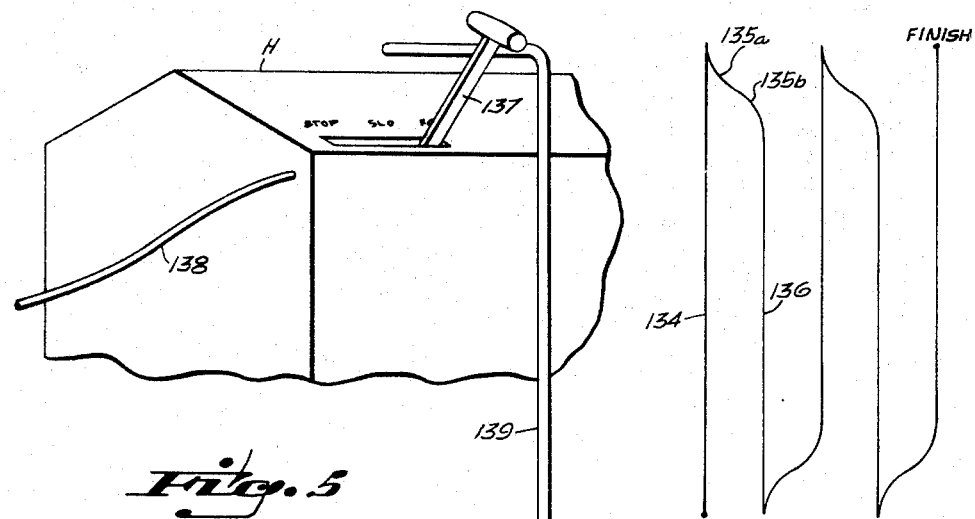
Fig. 5
Fig. 6
INVENTOR.
JOHN D. WISE
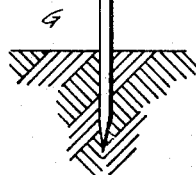
ATTORNEY Dec. 10, 1968 J. D. WISE 3,415,335
DRIVERLESS LAWN MOWER
Filed May 22, 1967 4 Sheets-Sheet 4
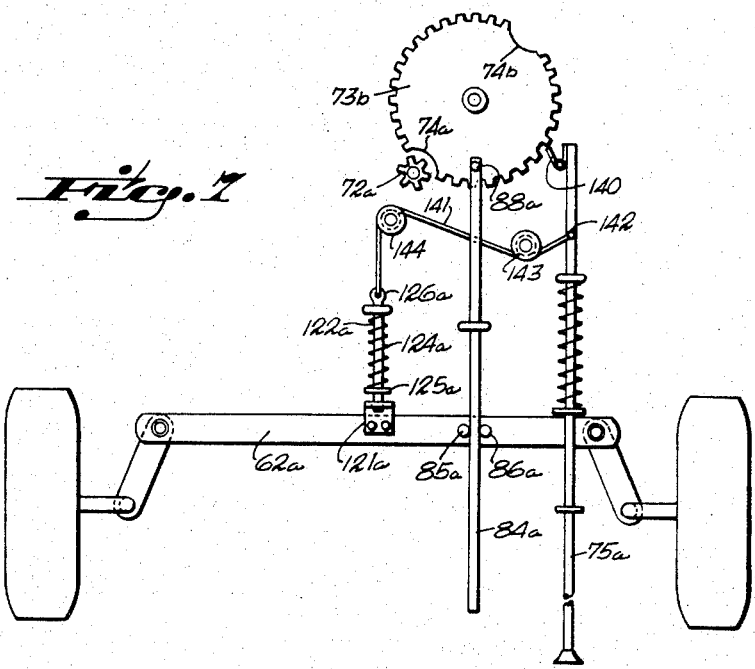
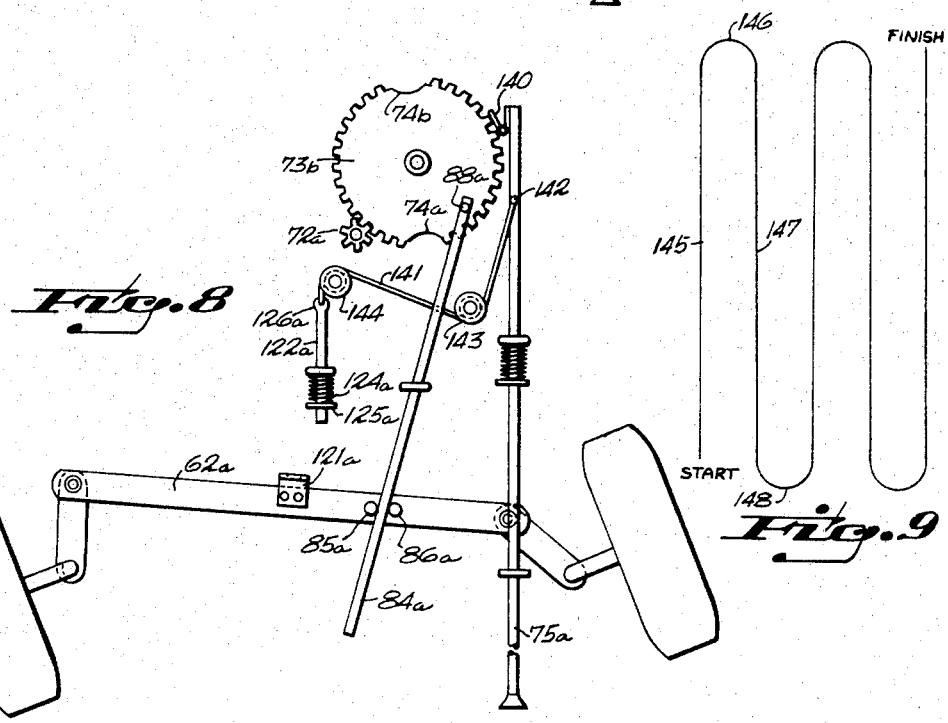
INVENTOR.
JOHN D. WISE
BY James J. Cannon
ATTORNEY.

United States Patent Office 3,415,335
Patented Dec. 10, 1968

3,415,335
DRIVERLESS LAWN MOWER
John D. Wise, 99 E. 33rd St.,
Paterson, N.J. 07514
Filed May 22, 1967, Ser. No. 639,998
9 Claims. (Cl. 180—79)

ABSTRACT OF THE DISCLOSURE

A driverless, self-powered lawn mower or the like land processing device, including abutment rods and mechanism controlled by actuation of the abutment rods upon striking an abutment at the end of a straight line path of travel for reversing the line of travel along a path adacent the last previous path for systematically mowing or otherwise processing a predetermined land area.

---

This invention relates to mechanism for automatically controlling the path of travel over the ground of a self-powered, driverless farming or lawn care equipment, and is directed particularly to improved mechanism for controlling the path of travel of a self-powered, driverless lawn mower, so as to mow a given lawn area without supervision of any kind.

One object of the invention is to provide an automatic lawn mower of the character described which, once having been started and furnished with sufficient fuel, will sense when to turn around at the end of a run and thereupon automatically control clutch and steering mechanism to reverse and travel alongside of the previous run to cut the next successive strip of lawn and thereafter continue such back and forth travel until the entire lawn area to be cut is finished, means being provided at the finish point to automatically stop the device.

A more particular object is to provide an automatic lawn mover of the character described including means for stabilizing the steering mechanism when directed in the straight forward or reverse positions to minimize the possibility of wandering from a straight course due to ground surface irregularities.

Still another object is to provide an automatic lawn mower of the character described wherein reverse travel as described above can be accomplished either by 180 degree turning around of the machine at the end of a run, or moving in the straight reverse direction after first having shifted to one side to be in position to mow the next adjacent strip of lawn.

Yet another object of the invention is to provide a driverless apparatus of the character described which will be simple in operation, easy to use, and dependable, effective and durable in performance.

Other objects, features and advantages of the invention will be apparent from the following description when read with reference to the accompanying drawings.

In the drawings, wherein like reference numerals denote corresponding parts throughout the several views:

FIG. 4 is a transverse vertical cross-section taken along the line 4—4 of FIG. 3 in the direction of the arrows;

FIG. 5 is a partial view of the mower, illustrating how it is stopped at the completion of a lawn mowing operation;

FIG. 6 illustrates, diagrammatically, the path of travel of the driverless lawn mower when set to travel in reverse during every other run, appropriately offsetting at each end of every run so as to operate in successively adjacent paths of travel;

FIGS. 7 and 8 illustrate, separately and on an enlarged scale, mechanism controlling the steering and stabilizing when in straight position for directly forward or reverse travel, and FIG. 9 illustrates, diagrammatically, the alternative path of travel of the driverless lawn mower when set to turn 180 circular degrees in direction at the end of each run so as to move only in the forward direction in a lawn cutting operation.

Figure 1:
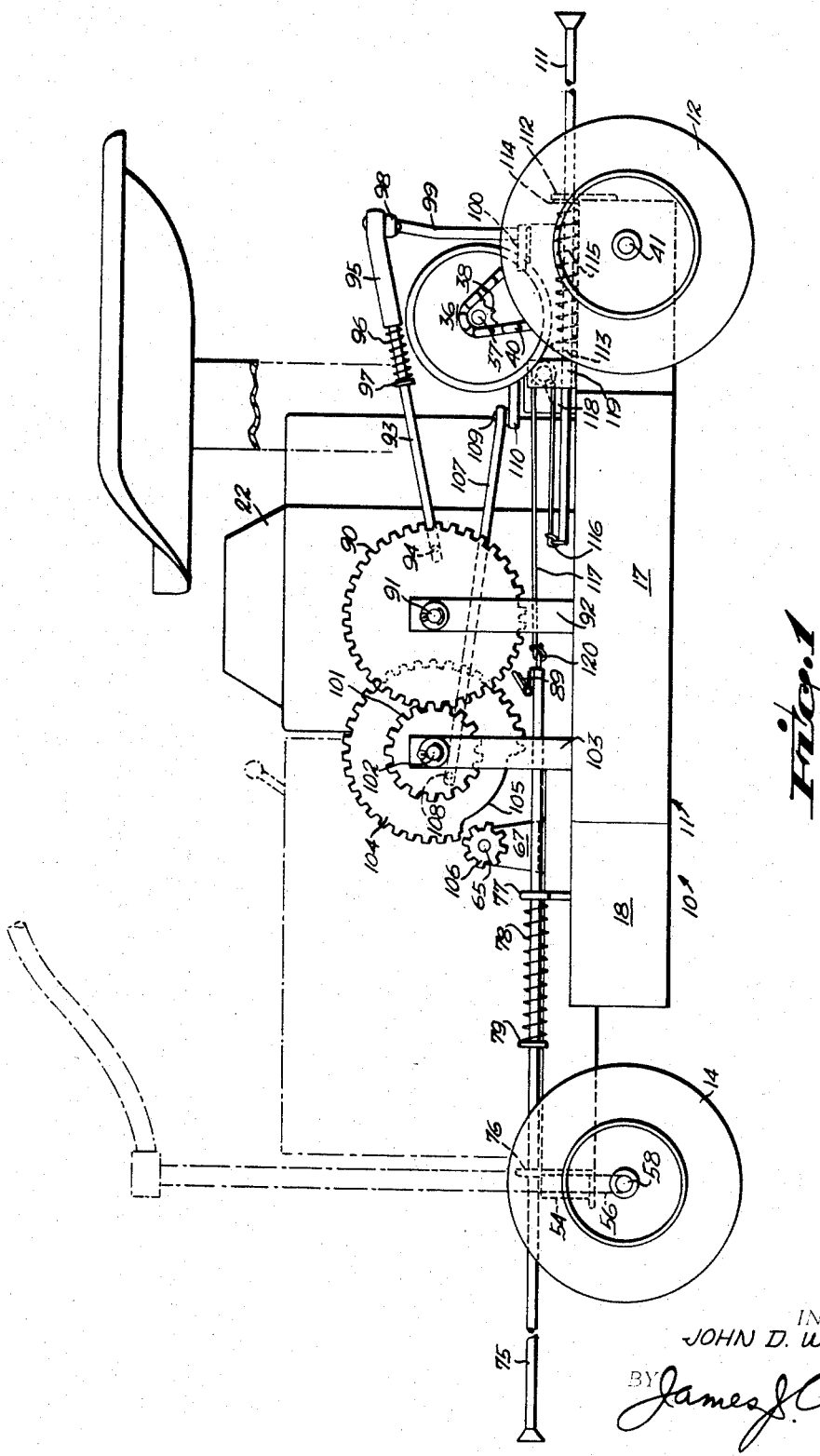
FIG. 1 is a side elevational view of a driverless lawn mower embodying the invention.
Figure 2:
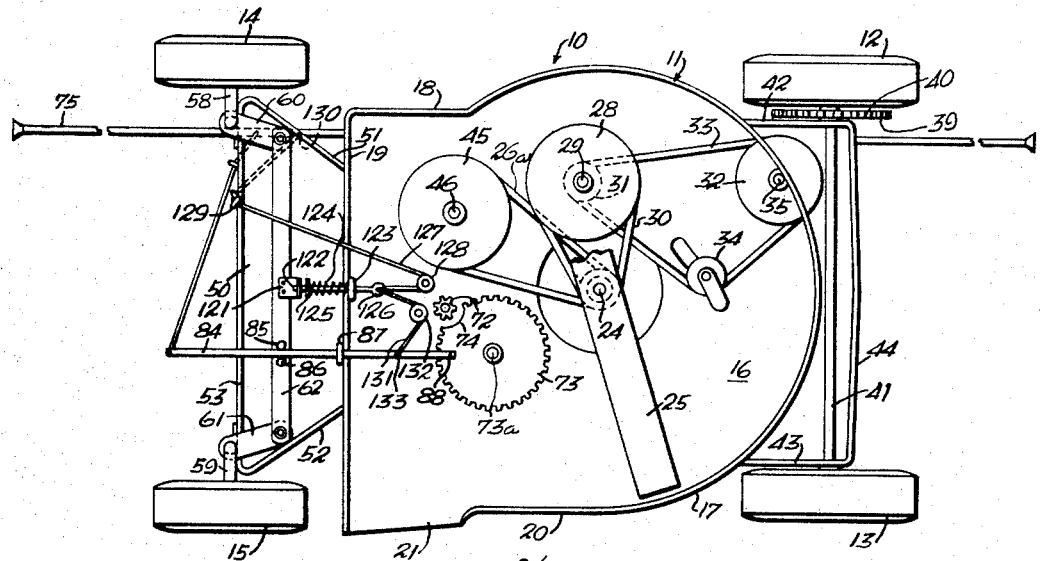
FIG. 2 is the bottom view thereof.
Figure 3:
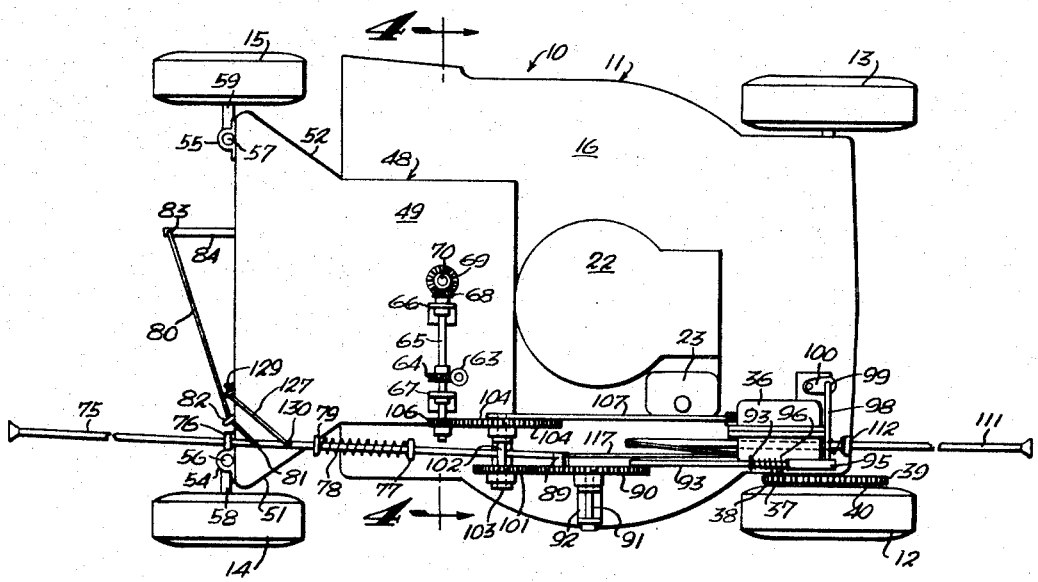
FIG. 3 is the top view thereof.

Referring now in detail to the drawings, 10 in FIGS. 1, 2, and 3, designates, generally, a driverless lawn mower embodying the invention, the same being comprised of a housing 11 supporting rear wheels 12 and 13 and front wheels 14 and 15. The housing 11 which may be fabricated of cast metal or stamped of sheet metal, is formed with a top wall portion 16 circularly rounded at the rear end thereof and formed with an integral, downwardly-extending peripheral skirt portion 17 which, as illustrated in FIGS. 1 and 2 merges at one side into a forwardly-extending skirt wall portion 18. The front end of the skirt portion 18 turns into a transversely-extending front skirt portion 19, which terminates at the other side of the housing 11. The other side of the peripheral skirt portion 17 of the housing 11 terminates at a position short of the outer end of the transverse skirt portion 19 to define together therewith and with the top wall 16 or the housing 11, a rectangular opening or chute 21 for the discharge of grass or the like being mowed when the device is in operation.

The apparatus is powered by a motor 22, preferably a gas engine, which is centrally affixed atop the top wall 16 of the housing 11 in any conventional fashion. As illustrated in FIG. 3, the motor 22 is provided with a gas tank 23; and as illustrated in FIG. 2, the drive shaft 24 of said motor has affixed to the outer end thereof a standard rotary cutter blade 25. Also secured to the drive shaft 24 is a first or upper drive pulley 26 and a second or lower drive pulley 27, (see FIGS. 2 and 4). The second drive pulley 27 drives a large pulley 28, journalled on a short shaft 29 fixed to and extending downwardly of the underside of the housing top wall 16, by means of a belt 30. As best illustrated in FIG 2, the short shaft 29 also carries a small pulley 31 which continuously drives a transmission drive pulley 32, through a belt 33, said belt also being trained over an idler pulley 34 adjustably fixed with respect to the underside of the top wall portion 16 of the housing 11. The transmission drive pulley is carried by the drive shaft 35 of a transmission mechanism 36 which, as best illustrated in FIGS. 1 and 3, is fixed upon the housing 11 at a rear corner position thereof. Because of the rear corner position of the transmission mechanism 36 and its associated drive pulley 32, an appropriate slot, not illustrated, is cut in the peripheral skirt portion of the housing, to accommodate said pulley and its drive belt.

As best illustrated in FIGS. 1 and 3, the output shaft 37 of the transmission mechanism 36 carries a sprocket gear 38 which drives a rear wheel drive sprocket 39 (see FIGS. 2 and 3), through a drive chain 40. The wheel drive sprocket 39 is secured near one end of a rear axle 41, journalled in side portions 42, 43 of a U-shaped housing extension member 44 affixed against the rear end of the housing 11 in any convenient fashion such as by welding. From the foregoing, it will be apparent that whenever the motor 23 is running, the associated cutter blade 25 will be rotating, and the input or drive shaft of the transmission mechanism 36 will be turning. As hereinafter described, the transmission mechanism 36 is provided with clutch and reversal mechanisms by means of which the drive to the rear wheels 12 and 13 is controlled.

The mechanism for controlling the turning or reversal of direction of the wheels will now be described. To this end, the first drive pulley 26 on the drive engine output shaft is connected, through a belt 26a, to a control pulley 45 fixed on a stub shaft 46 journalled in a bushing 47 which, as best illustrated in FIG. 4, is fixed between the top wall 16 of the housing 11 and a vertically-spaced raised deck housing portion 48, secured against said top wall. The raised deck housing portion 48 is formed with a top wall 49 and, as illustrated in FIGS. 2 and 4, a forwardly-extending portion 50 having divergent side wall portions 51, 52 and a front wall skirt portion 53. The front wall skirt portion 53 has affixed thereto, at each side, a pair of opposed, vertically-extending bushings 54, 55 having journalled therein, respectively, vertically-upstanding portions 56, 57, of opposed, triangular wheel axles 58, 59, to the outer ends of which are journalled the front wheels 14, 15, respectively. Fixed to the vertically-upstanding portions 56, 57 respectively, of the front wheel axles are opposed rearwardly-extending crank arms 60, 61, the outer ends of which are pivotally linked by a transverse tie rod 62. As is herein below more particularly described, means is provided for moving the tie rod 62 to one side or the other of the central position at which it is normally positioned for straight-forward or reverse travel of the apparatus, to turn the apparatus in one direction or the other.

As illustrated in FIGS. 3 and 4, the drive shaft 46 associated with the control pulley 45 extends upwardly of the upper deck portion 48 of the housing 11 and carries at its outer end a worm gear 63. The worm gear 63 is in mesh with a worm wheel 64 carried on a transversely-extending shaft 65 journalled in bearings in laterally-spaced, opposed brackets 66 and 67, affixed atop the raised deck housing portion 48. The shaft 65 at one end carries a bevel gear 68 in mesh with a second bevel gear 69 carried by a vertical shaft 70 journalled in a bearing member 71 secured between the top wall portion 16 and the raised deck housing portion 48 or the housing 11. The lower end of the shaft 70 extends through the top wall portion 16 and the raised deck housing portion 48 of the housing 11. The lower end of the shaft 70 extends through the top wall portion 16 of the housing 11 and has affixed thereto a small gear or pinion 72 in mesh with a steering gear 73 which, as illustrated in FIG. 2 is formed in its periphery with an arcuate cut-out portion 74 effecting non-engagement with the pinion 72 when in position just opposite it, as illustrated in FIG. 2. The steering gear 73 is affixed on a stub shaft 73a journalled in a bearing 73b affixed with respect to the underside of the top wall portion 16 of the housing 11.

As illustrated in FIGS. 1 and 3, a push-rod 75 extends horizontally from the front of the machine along the underside of the housing 11, being guided for longitudinal motion with respect thereto by its passage through an opening in a front bracket member 76 and an eyelet 77 both fixed with respect to said housing. A helical spring 78 circumjacent the push-rod 75 and constrained between the front surface of the eyelet 77 and a stop washer 79 fixed on said push-rod, normally holds the push-rod in its forwardmost extended position. As illustrated in FIGS. 2 and 3, a flexible cable 80 is affixed at one end to the push rod 75 at a position just rearward of the front bracket 76, as indicated at 81, and extends through an eyelet 82 fixed with respect to the housing 11 to be guided for connection at its other end to the outer end of a steering control rod 84, as indicated at 83. The steering control rod 84, as illustrated in FIG. 2, extends between a pair of spaced pins 85, 86, fixed with respect to the front wheel tie rod 62 and thence extends through an eyelet 87 fixed with respect to the housing 11 and constituting a pivot point for said steering control rod, as is hereinafter described. The inner end of the steering control rod 84 is pivotally connected to an outer portion of the steering gear 73, as indicated at 88 in FIG. 2. In the position of the steering gear 73 illustrated in FIG. 2, it will be noted that said gear is out of engagement with respect to the continuously-driven pinion gear 72 and that, therefore, the steering control rod 84 will remain stationary at such position with respect to the tie-rod 62 as will maintain the positions of the front wheels 14 and 15 in the forward direction.

Means is provided for shifting the transmission mechanism 36 into reverse upon actuation of the push-rod 75. To this end, the inner extremity of the push-rod 75 is as illustrated in FIG. 1, provided with a spring-pressed, outwardly and upwardly-extending pawl 89 adapted, when said push-rod is actuated, to engage the peripheral teeth on a reversing gear 90. As illustrated in FIGS. 1 and 3, the reversing gear 90 is affixed to a shaft 91 journalled in a U-shaped bracket 92 fixed to and extending upwardly of the housing 11 at one side thereof. A gear shift shaft 93 is pivotally affixed at one end to an outer portion of the shifting gear 90, as indicated at 94. The outer end of the gear shift shaft 93 extends into a sleeve arm 95 to which it is connected through a lost motion device comprising a spring 96 circumjacent said shaft, and is constrained between the outer end of said arm and a washer 97 fixed to said shaft at a position forward of said arm. The shift arm 95 is provided with a laterally-extending portion 98 at its outer end which terminates in connection with the shift lever 100 of the transmission 36, as indicated at 99. The reversing gear 90 is in mesh with a smaller intermediate gear 101 carried by a shaft 102 between the upstanding arms of a U-shaped bracket 103 fixed with respect to the top wall 16 of the housing 11. The shaft 102 extends outwardly of the inside of the bracket 103, as is best illustrated in FIG. 3, and carries on its outer end a clutch control gear 104 having a peripheral recess 105. The clutch control gear 104 is adapted to engage with a continuously-driven drive gear or pinion 106 secured to the outer of the above-described continuously-driven shaft 65. A rearwardly extending clutch drive shaft 107 is pivotally fixed at one end, as indicated at 108, to an outer side portion of the clutch control gear 104, as illustrated in FIGS. 1 and 3, and extend rearwardly to the clutch lever 110 associated with the transmission 36, whereat it is pivotally connected as indicated at 109.

Push-rod means is also provided for controlling the turning or reversal of direction of the apparatus upon abutment with a fixed object when travelling to the rear. To this end a push-rod 111 is provided for longitudinal sliding movement at the rear of the apparatus, said push-rod being guided through an opening in a rear bracket 112 affixed to and extending upwardly from the rear housing portion 44, and an eyelet 113 also extending upwardly from said housing forwardly of the bracket 112. The pushrod 111 has fixed thereon a washer 114 which abuts against the inside of the rear bracket 112 to limit outward movement thereof. A helical compression spring 115 circumjacent the push-rod 111 and constrained between the eyelet 113 and the washer 114 serves to hold said push-rod resiliently in its outermost position. As indicated at 116 in FIG. 1, a flexible cable 117 is connected to the inner end of the pushrod 111 and extends over a reversing pulley 118 journaled on a bracket 119 fixed with respect to and extending upwardly of the rear housing portion 44 of the housing 11 to terminate in connection with the inner end of said front pushrod as indicated at 120. With such construction, it will be apparent that upon pushing either of the front and rear push-rods 75 and 111 inwardly, the spring pawl 89 at the inner end of the front push-rod 75 will be brought into the engagement with the peripheral teeth of the reversal control gear 90 to actuate the steering mechanism as is herein below described.

Means is provided for locking the front wheels 14, 15 in straight position when the apparatus is traveling either directly forward or directly backward. To this end a bracket 121 is centrally affixed to the tie-rod 62, said bracket extending downwardly and having an opening receivable within which is a lock pin 122. The lock pin 122 is reciprocally mounted in a sleeve bearing 123 affixed to the transverse front skirt portion of the housing 11. A helical compression spring 124 circumjacent the lock pin 122 and constrained between the outside of the sleeve bearing 123 and the inside of a washer 125 fixed to said lock pin near the outer end thereof, serves to hold said lock pin resiliently in its outermost position as permitted by cable means herein below described. The inner end of the lock pin 122 is provided with an eyelet 126 which has connected thereto a first cable 127 extending over a reversing idler pulley 128 fixed to the underside from the housing 11 near the front end thereof, thence forwardly through an eyelet 129 fixed to the front end of the top wall 49 of said housing for connection with the front push-rod 75 at a position slightly to the rear of the connection thereto of cable 80 (see FIGURES 2 and 3). As illustrated in FIG. 2, a second cable 131 connected at one end to the eyelet 126 at the inner end of the lock-pin 122 extends over an idler pulley 132 affixed against the underside of the housing 11 and terminates in connection with an inner end portion of the steering control rod 84, as indicated at 133.

Considering now the operation of the apparatus, and referring to FIGS. 1 through 6, it will be understood that since the lock pin 122 is received within the opening in the bracket 121 under normal conditions, the apparatus will travel in a straight ahead or straight to the rear course. Referring to FIGURE 6, if the engine is started at the point indicated START, it will move along a straight path (a straight forward path of travel, for example) until it reaches the end of its predetermined straight path of travel, whereupon the push-rod 75 will strike an abutment, whether in the form a a building, for example, or an abutment member particularly placed to effect reversal, whereupon, as herein above described, the spring pawl 89 will engage with and turn the reversing gear 90. Such anti-clockwise turning of the reverse gear 90 (as illustrated in FIG. 1) will turn the clutch control gear 104 through clutch intermediate gear 101, whereupon said clutch control gear will be moved clockwisely and into engagement with continuously driven drive gear 106 at the end of the peripheral cut-out portion 105 thereof. The clutch gear 104 will then turn nearly a complete turn until it reaches the cut-out portion 105 again, during which time the clutch drive shaft 107 will have been moved backwardly to temporarily disengage the clutch forming part of the transmission mechanism 36 through actuation of the clutch lever 110. At the same time, because of the 1 to 2 ratio of the clutch intermediate gear 101 with respect to the reversing gear 90, said reversing gear will have turned approximately 180 circular degrees to move its associated gear shift shaft 93 rearwardly, but an amount sufficient to correspondingly move the shift lever 100 of the transmission 36 into reverse.

It is also to be noted that when the push-rod is pushed inwardly to effect clutch actuation and reversal of the transmission mechanism 36 as described above, the cables 127 and 128 will be pulled over the idler pulleys 131 and 132, with the result that the lock-pin 122 will be pulled outwardly of the tie-rod bracket 121 to release same, and the steering control 84 will be pivoted counterclockwise about the eyelet 87, as seen in FIG. 2 to simultaneously move the front wheels 14 and 15 to the right, as seen in FIG. 2, and to turn the steering gear 73 clockwisely, so that it engages with the continuously rotating pinion gear 72. Once having been brought into such engagement, the steering gear 73 will make a full 360 degree turn, and in doing so will first turn the wheels to the right and then to the left (a shown in FIG. 2) before coming into straight position again. Thus, as seen in FIG. 6, at the same time that the engine transmission is put into reverse as described above, the front wheels 14 and 15 will first be turned so that the vehicle moves in one direction as indicated at 135a and then immediately turns in the other direction as indicated in 135b before resuming straight position again as represented by the straight line path of backwards travel indicated at 136. The device will thereafter continue to move backwards until the rearwardly-extending push-rod 111 strikes an abutment, whereupon a new cycle of transmission reversal and offset steering as described above will be effective. The device will continue to move back and forth in this manner until reaching the finish point, indicated at FINISH in FIG. 6. To automatically stop the engine at the finish point, the hand throttle 137 (connected with the engine as by cable 138) can be made to strike an abutment stake 139 appropriately placed near the finish point for this purpose. As illustrated in FIG. 5, the throttle 137 will be moved to the stop position, as indicated on the hood H of the apparatus (partially shown in FIG. 5). It will be understood that the above-described reversal and steering will be so timed, and of such amounts with respect to the steering, as will offset successive paths of travel of the apparatus by the distance needed to mow or otherwise process an abutting strip of ground.

FIGS. 7, 8, and 9 illustrate a modification of the invention wherein the apparatus turns a full 180 circular degrees at the end of each run, so that it will always move in the forward direction. With such operation, it will be apparent that transmission reversal is not necessary, so that only the mechanism for turning the apparatus will now be considered. As illustrated in FIG. 7, upon pushing in the front push-rod 75a a spring pawl 140 secured at the inner end of said push-rod serves to turn the steering gear 73b sufficiently to move a first recess 74a past the continuously-moving pinion 72a, whereupon it will engage with the teeth at one side of said steering gear to turn it in one direction or the other until the second cutout or recess 74b reaches said pinion. In so turning, the steering gear 73b, as illustrated in FIG. 8, will move the steering control rod 84a, in one direction only (as seen in FIG. 8), after which it will come back to rest again in the straight ahead position. It will be understood that such movement of the front wheel is effected by the outer end of the steering control rod 84a being constrained between the spaced pair of pins 85a and 86a carried by the tie-rod 62a. In order to unlock the tie-rod 62a to permit the above-described turning, a cable 141 attached at one end to the push-rod 75a near the inner end and directed over idler pulleys 143 and 144 connects at its other end to the eye 126a at the inner end of the lock-pin 122a. Upon pushing in of the push-rod as described above for steering, it will be understood that the cable 141 will be pulled upon to withdraw the lock-pin 122a against the compressional force of the spring 124a, thereby releasing said pin with respect to the tie-rod bracket 121a, as illustrated in FIG. 8. Thus, as illustrated in FIG. 9, the device, upon being set into motion at the START position, will travel a forward path, indicated at 145, to an end position, whereupon the abutment rod 75a will strike an abutment of one kind or another at the end position of the run as described above, the front wheels will thereupon be turned in one direction only, for sufficient time to complete a 180 degree turn as indicated at 146 in FIG. 9, after which the wheels will be in straight ahead position again to effect a forward path of travel 147 in the opposite direction until the push-rod 75a is again actuated at the end of the run, whereupon the apparatus will, as described above, make another 180 degree turn, as indicated at 148, to direct the apparatus in the opposite direction, such a course of travel being continued until the device reaches the finish point where it may be automatically stopped by use of a throttle actuating device as illustrated in FIG. 5 and described above. With reference to FIGS. 7 and 8, it is to be noted that since the steering gear 73b moves only 180 circular degrees at each time of actuation, because of the two diametrically opposed recesses 74a and 74b in said gear, the steering control rod 74a will be pivotally swung first in one direction and then in the other direction, alternately, so that the wheels of the device correspondingly will first be turned in one direction and then in the other direction at the end of successive runs.

What I claim as new and desire to secure by Letters Patent is:

1. An automatically controlled, self-powered land travelling apparatus for lawn moving and the like, comprising a housing, rear wheel means supporting the rear of said housing for rolling motion along the ground, a pair of front wheels supported at the front of said housing for rolling motion of the front of said housing along the ground, tie rod means including a tie rod movable from side-to-side with respect to the front of said housing for steering said front wheels from one side to the other, a rotary engine secured with respect to said housing, drive means interconnecting said engine with said rear wheel for moving said apparatus along the ground, a push rod extending forwardly of the front of said housing and reciprocably mounted with respect thereto from front to back, resilient means normally constraining said push rod in its front-most position, and means including said tie rod means and means driven by said engine and controlled by said push rod striking an abutment for turning said front wheels in one direction for a sufficient length of time to effect reversal of the path of travel of the apparatus.

2. An automatically controlled, self-powered land travelling apparatus as defined in claim 1, wherein said rear wheel means comprises a pair of spaced rear wheels.

3. An automatically controlled self-powered land travelling apparatus as defined in claim 1 including means for locking said tie bar in fixed position with respect to said housing for holding said front wheels in straight ahead position when said push rod is in its front-most position.

4. An automatically controlled, self-powered land travelling apparatus as defined in claim 3, wherein said wheel turning means comprises a steering gear rotatably journalled with respect to said housing, a continuously rotating pinion engageable with said steering gear, a recess within the periphery of said steering gear, said pinion gear being so disposed as to be received within said steering gear recess for normal disengagement with said steering gear, means at the inner end of said push rod for moving said steering gear into mesh with said pinion for turning said steering gear through a cycle of operation, a steering control rod pivotally linked at one end to the face of said steering gear, a pivotal opening fixed with respect to said housing through which said steering control rod extends, and a pair of spaced pins on said tie rod between which said steering control rod extends at its other end for moving said tie rod in response to turning of said steering gear.

5. An automatically controlled, self-powered land travelling apparatus for lawn mowing and the like, comprising a housing, rear wheel supporting the rear of said housing for rolling motion along the ground, a pair of front wheels supported at the front of said housing for rolling motion of the front of said housing along the ground, tie rod means including a tie rod moveable from side-to-side with respect to the front of said housing for steering said front wheels from one side to the other, a rotary engine secured with respect to said housing, drive means interconnecting said engine with said rear wheel for moving said apparatus along the ground, said apparatus moving drive means including a clutch and a transmission having directional reverse mechanism, a push rod extending forwardly of the front of said housing and reciprocably mounted with respect thereto from front to back, resilient means normally constraining said push rod in its front-most position, and means including said tie-rod means and means driven by said engine and controlled by said push-rod striking an abutment for actuating said clutch and reversing said transmission and simultaneously turning said front wheels first in one direction and then in the other direction for sufficient lengths of time, respectively, for off-setting the reverse path of travel of said apparatus by a predetermined distance.

6. An automatically controlled self-powered land travelling apparatus as defined in claim 5 including means for locking said tie-bar in fixed position with respect to said housing for holding said front wheels in straight ahead position when said push rod is in its front-most position.

7. An automatically controlled self-powered land travelling apparatus as defined in claim 6, wherein said wheel turning means comprises a steering gear rotatably journalled with respect to said housing, a continuously rotating pinion engageable with said steering gear, a recess within the periphery of said steering gear, said pinion gear being so disposed as to be received within said steering gear recess for normal disengagement with said steering gear, means at the inner end of said push rod for moving said steering gear into mesh with said pinion for turning said steering gear through a cycle of operation, a steering control rod pivotally linked at one end to the face of said steering gear, a pivotal opening fixed with respect to said housing through which said steering control rod extends, and a pair of spaced pins on said tie rod between which said steering control rod extends at its other end for moving said tie rod in response to turning of said steering gear.

8. An automatically controlled self-powered land travelling apparatus as defined in claim 7 including abutment means for automatically turning off said engine upon said land travelling apparatus reaching a predetermined position in an area of land over which said land travelling apparatus has been operating.

9. An automatically controlled self-powered land travelling apparatus as defined in claim 8 wherein said steering gear moving means comprises a spring pawl at the inner end of said push rod operative to engage with and move the peripheral teeth of said steering gear upon front to back movement of said push rod.

References Cited

UNITED STATES PATENTS

| | | | |
|---|---|---|---|
| 1,988,396 | 1/1935 | Pellerin | 46—212 |
| 2,674,332 | 4/1954 | Orshinsky | 180—79.1 |
| 2,885,019 | 5/1959 | Gardner | 180—79 |
| 2,906,362 | 9/1959 | Bierly | 180—79.3 |
| 2,923,954 | 2/1960 | Babcock | 15—1.7 |
| 3,052,076 | 9/1962 | Bambi | 56—25.4 |

KENNETH H. BETTS, *Primary Examiner.*

U.S. Cl. X.R.

46—212; 56—25.4; 180—79.3